United States Patent [19]

Cohen

[11] Patent Number: 5,076,308

[45] Date of Patent: Dec. 31, 1991

[54] INDICATOR FOR MEASURING AMOUNT OF VALVE OPENING

[75] Inventor: Mordechai Cohen, San Diego, Calif.

[73] Assignee: Sundstrand Corporation, Rockford, Ill.

[21] Appl. No.: 615,382

[22] Filed: Nov. 19, 1990

[51] Int. Cl.⁵ .................... F16K 35/02; F16K 37/00
[52] U.S. Cl. .................................. 137/1; 137/556.3; 74/553; 116/277; 251/96; 251/208; 251/288; 251/305
[58] Field of Search ............... 116/277, 284, 297, 309, 116/315; 74/553; 137/553, 556, 556.3, 556.6; 251/95, 96, 110, 111, 112, 113, 285, 288, 305; 16/121

[56] References Cited

U.S. PATENT DOCUMENTS

| | | |
|---|---|---|
| 404,844 | 6/1889 | Kennedy . |
| 473,488 | 4/1892 | Wood . |
| 657,059 | 8/1900 | Broomell ........................... 251/110 |
| 1,161,861 | 11/1915 | Hodges ............................. 137/553 |
| 1,244,630 | 10/1917 | Mitchell . |
| 1,444,780 | 2/1923 | Davis ................................ 251/113 |
| 1,446,652 | 2/1923 | Morris ............................... 74/553 |
| 1,584,587 | 5/1926 | Yardley . |
| 2,167,321 | 7/1939 | Abercrombie . |
| 2,515,837 | 7/1950 | Quinn . |
| 2,599,286 | 6/1952 | Rockwell . |
| 2,614,520 | 10/1952 | Allen . |
| 3,173,650 | 3/1965 | Cotterman et al. ............... 251/288 |
| 3,192,945 | 7/1965 | Blakeley .......................... 137/556 |
| 3,230,971 | 1/1966 | Roasen ........................... 137/556.3 |
| 3,537,473 | 11/1970 | DeZurik, Jr. ....................... 251/96 |
| 3,656,504 | 4/1972 | Topinka . |
| 3,701,362 | 10/1972 | Reese . |
| 4,024,890 | 5/1977 | Yasuoka . |
| 4,133,288 | 1/1979 | Burgess . |
| 4,327,768 | 5/1982 | Behle . |
| 4,411,288 | 10/1983 | Gain, Jr. . |
| 4,691,895 | 9/1987 | Garff ................................. 251/96 |
| 4,718,445 | 1/1988 | Lundberg . |
| 4,779,305 | 10/1988 | Gorsek ............................. 74/553 |

FOREIGN PATENT DOCUMENTS

| | | | |
|---|---|---|---|
| 468140 | 6/1914 | France .............................. 137/556 |
| 15167 | 8/1897 | Switzerland ...................... 137/553 |

Primary Examiner—George L. Walton
Attorney, Agent, or Firm—Antonelli, Terry, Stout & Kraus

[57] ABSTRACT

An indicator for measuring the amount of closure of a valve with a valve handle mounted adjacent a valve bearing housing. A pointer for the indicator being mounted between the valve handle and valve bearing housing. To show the amount the valve is open the indicator pointer is firmly attached to the valve drive shaft. A slot is provided in the valve handle so that the relationship of the indicator pointer to the valve bearing housing can be seen, and rotation stubs are included on the valve handle which can abut against the indicator pointer so the valve drive shaft can be turned using the valve handle.

6 Claims, 2 Drawing Sheets

INDICATOR FOR MEASURING AMOUNT OF VALVE OPENING

TECHNICAL FIELD

The present invention relates generally to a position indicator for determining the amount valves are open, and more specifically to a position indicator which reports the orientation of the vane closing mechanism of a butterfly valve supplying cooling air into an aircraft nacelle.

BACKGROUND ART

Various apparatus and methods have previously been devised to provide indication of the positioning of valve closing mechanisms. U.S. Pat. No. 3,701,362 to Reese, for example, describes a butterfly valve having a position indicator attached via a nose piece fitted into a transverse slot on the end of the valve drive shaft. The drive shaft is then attached by a pin to the vane of a butterfly valve. According to the patent, as the drive shaft is rotated to control the opening of the butterfly valve, the disclosed position indicator moves with respect to an exterior wall face of the butterfly valve. Another valve opening indicator system is described in U.S. Pat. No. 4,02,890 to Yasuoka. The disclosed apparatus here includes a scale plate attached to the valve case of a rotary valve by a projection. Attached to the valve stem below the valve handle is an indicating rod. Together the indicating rod and scale plate are supposed to constitute a way for determining the amount the valve is open. Still another valve position indicator system is described in U.S. Pat. No. 2,515,837 to Quinn. The indicator system disclosed in this patent is formed by an arcuately movable pointer and a pair of indicator-label plates attached to a valve mounted in a box. The arcuately movable pointer is provided on a plate attached to the valve spindle. The indicator-label plates are attached to an internal surface of the wall of the valve casing.

The above prior art valve opening indicator systems in many cases are complex requiring specially machined parts such as nose pieces with slots and pairs of indicator-label plates. Because of such mechanical complexity their assembly must be both time consuming and costly to implement. Also, such indicators are either positioned between the valve handles and the valve bodies or are positioned off axis from the valve handles which frustrates ease of reading especially in poorly lighted conditions or in adverse weather environments such as heavy winds, rain or snow.

DISCLOSURE OF INVENTION

On aircraft for both safety and assured reliability, it is important to positively and readily know the position of butterfly valve closure mechanisms supplying cooling air which passes through the valves into nacelles. Improper control of the flow of cooling air passing through nacelles can cause overheating of equipment mounted in the nacelles. It is important that the position of automatically controlled butterfly valve closing mechanisms controlling flow of air be accurately known. B03767 is the subject of manual locking the valve in the open or the close position. Aircraft nacelles with cooling medium valves are often located in areas which are poorly lighted. Therefore, it is desirable to have an indicator system which can be easily read in low light environments even under bad weather conditions.

An object of the present invention is to provide inexpensive, rugged and accurate position indicators which can be easily implemented on cooling medium valves mounted on nacelles to monitor the state of closure of the valves.

Another object of the present invention is to provide inexpensive and accurate position indicators which can be incorporated in valve handles so as to minimize interference with nacelle surface areas adjacent the valves and facilitate reading.

Still another object of the present invention is to provide inexpensive, rugged and accurate position indicators which may be easily incorporated in valves already in service on nacelles.

It is still another object of the present invention to provide inexpensive, rugged and accurate position indicators which are easily read under poor lighting conditions.

These and other objects are attained by providing a valve position indicator system adjacent the handle that could be used to manually rotate the valve. For the present invention, the vane of a butterfly valve can be splined to the valve drive shaft, and an indicator pointer can be press fitted to the end of the same valve drive shaft. So as the butterfly valve vane is rotated along with the valve drive shaft, the indicator pointer accordingly rotates. Along a section of the valve drive shaft, between the indicator pointer and the butterfly vane, a bearing housing can be provided. This bearing housing can be a valve housing. The valve housing is then associated with a nacelle. As attached to the valve housing, the bearing housing neither translates or rotates with respect to the nacelle. This arrangement allows for rotation of the valve drive shaft in the bearing housing while the position relative to the bearing housing of the indicator pointer, which is fixed with respect to the nacelle to the valve drive shaft, provides an accurate measure of the closure of the valve. Fitted over the and of the bearing housing is a handle cup which can rotate about the bearing housing or can be fixed with respect to the bearing housing by a pin. The position of the indicator pointer with respect to the bearing housing can be viewed through a slot in the handle cup. When the handle cup is not fixed with respect to the bearing housing, the handle cup can be rotated about the bearing housing and the valve drive shaft. Additionally included on the handle cup are rotation stubs which, as the handle cup is rotated, will abut against the indicator pointer. So the valve drive shaft can be rotated as the handle cup is rotated by having the rotation stubs abutted against the indicator pointer which is firmly attached to the valve drive shaft.

BRIEF DESCRIPTION OF THE DRAWINS

The various objects, advantages and novel features of the present invention will become more readily apprehended from the following detailed description when taken in conjunction with the appended drawings, in which.

BEST MODE FOR CARRYING OUT THE INVENTION

Figure 1:
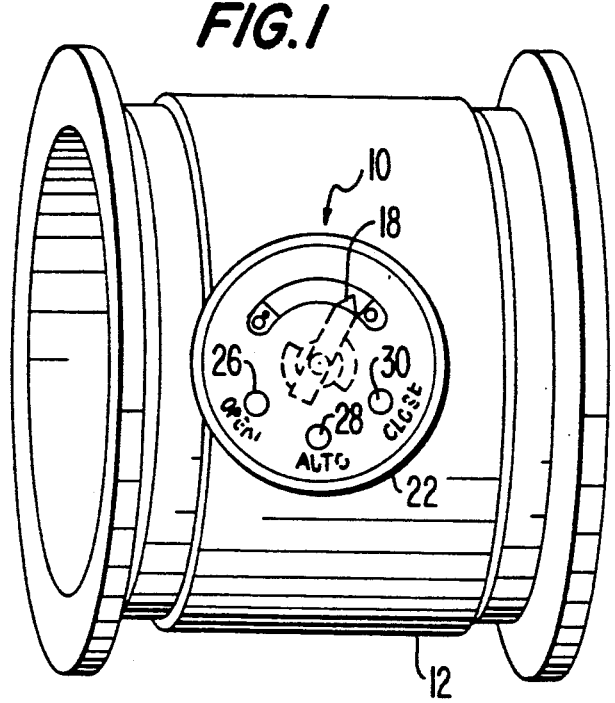
FIG. 1 is a perspective view of a valve housing with a handle cup for a butterfly valve and an indicator pointer of the present invention adjacent the letters "CL"
Figure 2:
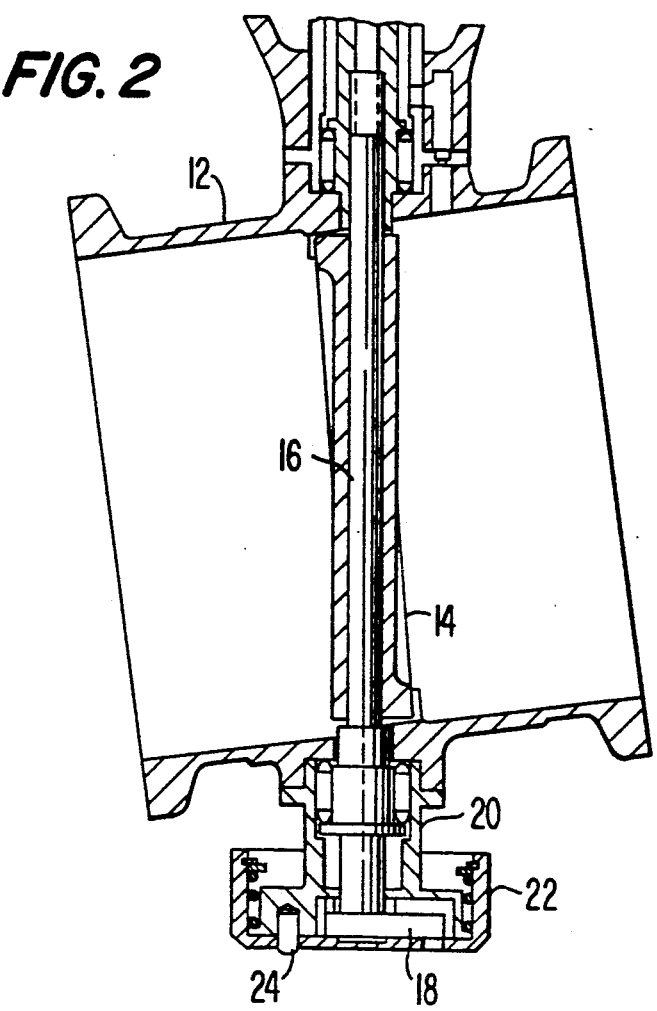
FIG. 2 is a sectional view taken along line 2—2 as shown in FIG. 1 of a valve housing with a butterfly valve, bearing housing, indicator pointer and handle cup.

Referring now to the drawings, wherein corresponding components are designated by the same reference numerals throughout the various figures. A valve closure indicating system according to the present invention is illustrated in FIG. 1 where it is generally designated by reference numeral 10. As shown in the preferred embodiment, the valve closure indicating system 10 is mounted on a valve housing 12. The valve includes a butterfly vane 14, shown in sectional view in FIG. 2, which is splined to the valve drive shaft 16. Press fit to one end of the valve drive shaft 16 is an indicator point 18. As mounted in the valve housing 12, the valve drive shaft 16 can rotate in a bearing housing 20 which is attached to the valve housing 12 so that the bearing housing 20 can neither translate or rotate. This relationship of the bearing housing 20 to the valve drive shaft 16, the butterfly vane 14 and the nacelle 12 means that as the butterfly vane 14 is rotated in the valve housing 12, the indicator pointer 18 rotates with respect to the bearing housing 20. For example, when the butterfly vane 14 is in the closed position in the valve housing 12 the indicator pointer 18 is adjacent the letters "CL" on the bearing housing 20, as shown in FIG. 1. If the butterfly vane 14 were open with respect to the valve housing 12 then the indicator pointer 18 would be adjacent the letters "OP" on the bearing housing 20.

Figure 3:
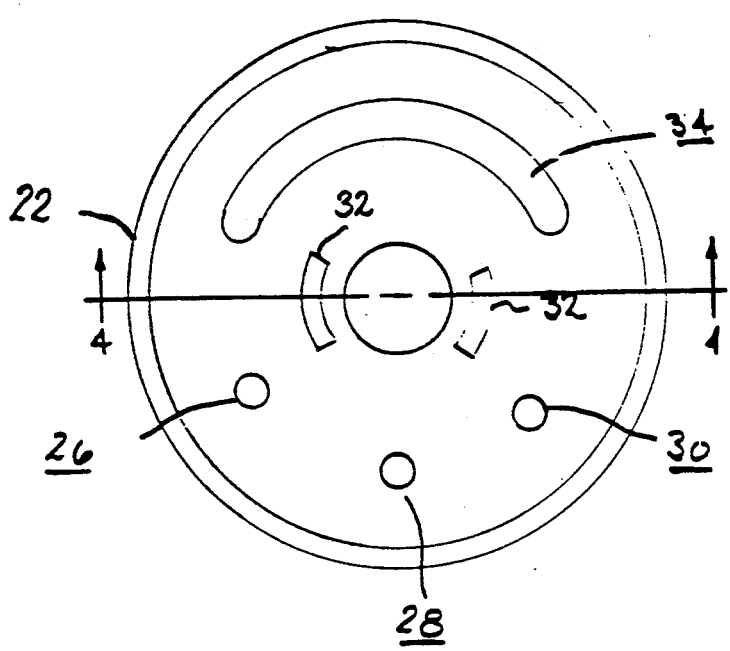
FIG. 3 is a bottom view of a handle cup.
Figure 4:
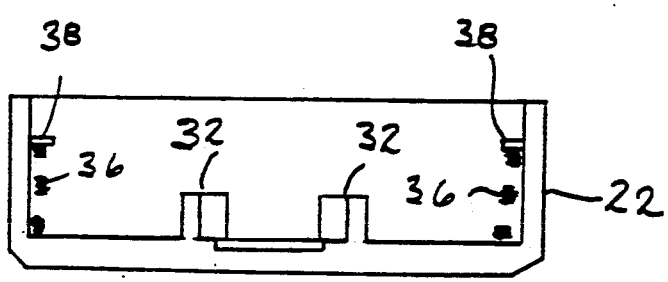
FIG. 4 is a sectional view of a handle cup taken along the line 4—4 shown in FIG. 3; and, FIG. 5 is a partial view of the sectional view shown in FIG. 4.

For the preferred embodiment, the rotational position of the butterfly vane 14 is primarily controlled by an automatic system (not shown). In normal operation the position of the butterfly vane 14 as controlled by the automatic system. Therefore, using the valve closure indicating system 10 of the present invention, the position of the butterfly vane 14 can be accurately measured by the rotational relationship of the indicator pointer 18 to the bearing housing 20 as explained above. If, however, an operator had to adjust the rotational position of the butterfly vane 14 manually, a handle cup 22 can be used. The handle cup 22 can be rotationally fixed with respect to the bearing housing 20 by a rotation pin 24 press fit into the bearing housing 20. The pin 24 can be positioned in any one of the holes 26, 28 or 30, respectively marked "open", "auto" or "close" in the handle cup 22, as shown in FIG. 3. By positioning the rotation pin 24 in the hole 26, marked "open", in the handle cup 22, the butterfly vane 14 is rotated to the full open position by having the rotation stubs 32 contact the indicator pointer 18 and rotate the valve drive shaft 16 with the butterfly vane 14 to the open orientation. If instead the handle cup 22 is rotated so that the rotation pin 24 is positioned in the hole 28, marked "auto", then the valve automatic control system determines the positioning of the butterfly vane 14. Finally, if the handle cup 22 is rotated so the rotation pin 24 is positioned in the hole 30, marked "close", then the butterfly vane 14 is rotated to the full closed position by having the rotation stubs 32 contact the indicator pointer 18 and rotate the valve drive shaft 16 with the butterfly vane 14 to the closed orientation.

Irrespective of the rotation pin 24 being in any of the holes 26, 28 or 30, the position of the indicator pointer 18 with respect to the bearing housing 20 can be readily viewed through the handle cup 22 by using the viewing slot 34 cut in the handle cup 22.

Figure 5:
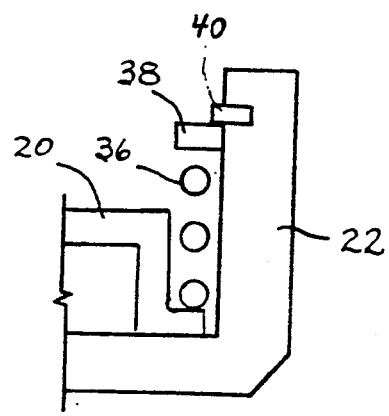

The handle cup 22 is always retained adjacent the bearing housing 20 by a spring 36 and retainer 38 that is firmly attached to the handle cup 22. Such arrangement is set out in FIG. 5 where spring 36 is shown pushing handle cup 22 towards bearing housing 20. Further, retainer 38 is attached to handle cup 22 with a retaining ring positioned in handle cup 22.

The above discussion and related illustrations of the present invention are directed primarily to a preferred embodiment and practices of the invention. However, it is believed that numerous changes and modifications in the actual implementation of the concepts described herein will be apparent to those skilled in the art, and it is contemplated that such changes and modifications may be made without departing from the scope of the invention as defined by the following claims.

I claim:

1. A valve closure indicator comprising:
   a valve drive shaft for opening and closing a valve, with an indicator pointer attached to the valve drive shaft;
   a bearing housing with the valve drive shaft rotatably mounted in the bearing housing;
   a handle cup rotatably mounted on the bearing housing with the handle cup having a rotation stub attached thereto with the stub engaging the indicator pointer for rotating the valve drive shaft and the indicator pointer by rotation of the handle cup; and
   the indicator pointer indicating the positional relationship of the indicator pointer with respect to the bearing housing to provide a measurement of an amount the valve is open.

2. A valve closure indicator according to claim 1, wherein the indicator pointer is between the bearing housing and the handle cup and the indicator pointer can be viewed through an opening in the handle cup.

3. A valve closure indicator according to claim 1, wherein the handle cup can be fixed against rotation with respect to the bearing housing by a rotation pin mounted on the bearing housing with the pin being able to fit in a hole in the handle cup.

4. A valve closure indicator according to claim 1, wherein the handle cup can be fixed against rotation with respect to the bearing housing by a rotation pin mounted on the handle cup, with said pin being able to fit in a hole in the bearing housing means.

5. A valve closure indicator according to claim 1, wherein the valve is mounted on a valve housing with the valve housing attached to a nacelle so that the bearing housing does not translate or rotate.

6. A method for measuring the closure of a valve using a valve closure indicator for the valve having a valve drive shaft for opening and closing the valve, with an indicator pointer attached to the valve drive shaft, a bearing housing with the valve drive shaft rotatably mounted in the bearing housing, a handle cup rotatably mounted on the bearing housing with the handle cup having a rotation stub engaging the indicator pointer so that the valve drive shaft and the indicator pointer can be rotated using the handle cup comprising:
   positioning the indicator pointer adjacent the bearing housing so that the positional relationship of the indicator pointer to the bearing housing gives a measure of opening of the valve; and
   measuring the opening of the valve by viewing the positional relationship of the indicator pointer with respect to the bearing housing.

* * * * *